ized Patent [19] [11] Patent Number: 5,994,688
Jackson et al. [45] Date of Patent: Nov. 30, 1999

[54] POSITION LEVELING SENSOR FOR A LASER TRANSMITTER

[75] Inventors: Jonathan Appleget Jackson; Ayman Zuhdi Hajmousa; Robert Matthew Perchak, all of Dayton; John Patrick Dugan, Cincinnati, all of Ohio

[73] Assignee: Spectra Precision, Inc., Dayton, Ohio

[21] Appl. No.: 08/834,472

[22] Filed: Apr. 11, 1997

[51] Int. Cl.[6] ................................................. G01B 11/26
[52] U.S. Cl. ........................ 250/206.2; 356/250; 356/255
[58] Field of Search ............................. 250/206.1, 201.1, 250/206.2; 356/250, 255; 33/227

[56] References Cited

U.S. PATENT DOCUMENTS

| 2,981,141 | 4/1961 | Armstrong et al. | 356/250 |
|---|---|---|---|
| 3,011,384 | 12/1961 | Biber | 356/250 |
| 3,764,220 | 10/1973 | Billman et al. | 356/153 |
| 3,765,772 | 10/1973 | Willett | 356/110 |
| 3,936,197 | 2/1976 | Aldrink et al. | |
| 4,062,634 | 12/1977 | Rando et al. | |
| 4,221,483 | 9/1980 | Rando | |
| 4,468,119 | 8/1984 | Hamar | 356/152 |
| 4,621,924 | 11/1986 | Williams | 356/153 |
| 4,662,707 | 5/1987 | Teach et al. | |
| 4,679,937 | 7/1987 | Cain et al. | 356/138 |
| 4,767,208 | 8/1988 | Cain et al. | 356/138 |
| 4,840,483 | 6/1989 | Haffner | 356/153 |
| 4,895,440 | 1/1990 | Cain et al. | |
| 4,912,851 | 4/1990 | Rando et al. | 33/227 |
| 5,144,486 | 9/1992 | Hart | |
| 5,257,279 | 10/1993 | Dugan et al. | |
| 5,375,663 | 12/1994 | Teach | |
| 5,513,001 | 4/1996 | Ohtomo et al. | |
| 5,517,023 | 5/1996 | Ohtomo et al. | |

FOREIGN PATENT DOCUMENTS

| 0643283A1 | 3/1995 | European Pat. Off. |
|---|---|---|
| 6201383 | 7/1994 | Japan |

OTHER PUBLICATIONS

"MinuteMarker General Construction/Interior Laser System Model 1462" Brochure, Published Oct. 26, 1996.

*Primary Examiner*—Edward P. Westin
*Assistant Examiner*—Thanh X. Luu
*Attorney, Agent, or Firm*—Killworth, Gottman, Hagan & Schaeff, LLP

[57] ABSTRACT

A device for leveling a laser transmitter is provided. An optical position sensor is used to measure the position of a compensator assembly. The compensator assembly automatically adjusts the position of the laser beam once the compensator assembly is within a specified range of level. Once the compensator assembly is within the specified range, the compensator assembly optically adjusts the laser beam so that it is plumb. A leveling device may be used to level the laser transmitter in response to the position of the compensator assembly as measured by the position sensor.

17 Claims, 10 Drawing Sheets

POSITION LEVELING SENSOR FOR A LASER TRANSMITTER

This application is related to commonly assigned U.S. patent application Ser. No. 08/834,473, now U.S. Pat. No. 5,867,522, AUTOFOCUSING SYSTEM FOR A LASER TRANSMITTER, filed Apr. 11, 1997, by Green et al.; Ser. No. 08/834,477, now U.S. Pat. No. 5,805,362, FOCUSING MECHANISM USING A THIN DIAPHRAGM, filed Apr. 11, 1997, by Hayes; Ser. No. 08/834,476, LASER TRANSMITTER INCORPORATING TARGET DITHER, filed Apr. 11, 1997, by Green et al.; and Ser. No. 08/833,978, now U.S. Pat. No. 5,844,679, SYSTEM FOR ADJUSTING THE ORIENTATION OF A PLANE OF LASER LIGHT, filed Apr. 11, 1997, by Detweiler et al., the disclosures of which are incorporated herein by reference.

BACKGROUND OF THE INVENTION

The present invention generally relates to a laser beam projection device and, in particular, to an arrangement for automatically leveling the device.

Laser light systems have been employed in numerous surveying and construction applications. In one such system, a laser light transmitting device provides a rotating laser beam which establishes a reference plane. In effect, the rotating laser beam is used to define a plane of light that acts as either a horizontal elevational reference or a sloped elevational reference, as desired, over an entire work area. The laser light is either detected by the naked eye or by one or more laser beam detectors, placed at considerable distances from the transmitting device. Various construction tasks may be performed based on visual perception of the laser light. Similarly, detectors may be used to intercept the rotating laser beam and determine a desired elevation and grade at selected points throughout the work area.

In the laser light transmitting device, the plane of light is produced by projecting the beam generally upward and then deflecting the beam ninety degrees within a pentaprism or pentamirror assembly. The pentaprism assembly is rotated about a vertical axis within the transmitting device to cause the beam to rotate, thereby defining the reference plane. The laser light transmitting device must be substantially level in order to function properly and to define the desired reference frame accurately. The beam of light which is projected upward will be substantially plumb with respect to the ground when the laser transmitting device is substantially level.

Prior art devices have included standard leveling vials attached to the housing of the laser light transmitting device to indicate to the transmitter operator that the transmitter is badly misaligned, and to permit manual adjustment of the transmitter to a more level position. Such leveling vials include a bubble suspended within a liquid medium, with the bubble position providing a rough indication of the degree of level of the housing. Leveling screws are included on the housing which may be adjusted by the operator to level the base. An automatic compensator may also be used to optically compensate for slight misalignments of the housing. The compensator includes a compensator cup which is suspended by thin wires within the housing, and a compensating lens in the cup, positioned in the path of the upwardly projected laser light. The compensator will automatically shift laterally so as to adjust the position of the laser beam so that it has a plumb orientation with respect to the ground as it emerges from the compensator. To function properly, the compensator must be within a certain degree of level, e.g. 12 minutes, in order to swing freely so as to have any effect on the orientation of the laser beam.

Such prior art devices are disadvantageous because the initial leveling of the base is dependent, in part, upon the skill of the operator. Manual leveling of the laser light transmitting device within 12 minutes is also tedious and time consuming for the operator. In addition, since the leveling operation is completed with respect to the base, the alignment between the housing and the compensator must be precise.

Other prior art systems include automatic leveling devices which attempt to level the laser light transmitting device based on a signal from an electronic leveling vial. The electronic leveling vials are similar to the standard leveling vials except the electronic leveling vials emit a signal representative of the relative position of the vial. The signal is then used to level the base of the laser light transmitting device to within 12 minutes so that the compensator may then adjust the position of the laser beam to a plumb orientation. Such systems are disadvantageous because the leveling activities are completed with respect to the base instead of the compensator. For accurate leveling so that the compensator is within 12 minutes of level, the alignment between the compensator and the housing must be precise.

Accordingly, there is a need for an accurate and automatic system for leveling a laser light transmitter which is independent of the alignment between the compensator and the housing.

SUMMARY OF THE INVENTION

The present invention meets the aforementioned needs by providing a position sensor in a laser transmitter for accurately and automatically leveling the same.

According to a first aspect of the present invention, a laser transmitting device comprises a housing, a laser light source coupled to the housing and generating laser light, a compensator assembly coupled to the housing, and a compensator assembly position detector. The compensator assembly receives and projects the laser light along a first axis. The compensator assembly position detector comprises a quadrant photodetector so that the compensator assembly position detector may detect a position of the compensator assembly with respect to an X-axis and a Y-axis. The compensator assembly may comprise an optics frame coupled to the housing and a compensator cup suspended from the optics frame. Preferably, the compensator assembly position detector further comprises a first light source coupled to the optics frame, the first light source projecting a first light, and a first optical element coupled to the compensator cup. The quadrant photodetector is coupled to the optics frame and receives the first light passed through the first optical element. The first optical element may be selected from the group consisting of refractors, diffractors, lenses, irises, opaque shields, pinhole aperture plates, mirrors, prisms and fiber optic cables.

Preferably, the quadrant photodetector comprises a first detecting area generating a first signal, a second detecting area generating a second signal, a third detecting area generating a third signal and a fourth detecting area generating a fourth signal. The first, second, third and fourth signals are representative of an amount of light projected onto respective detecting areas, such that the position of the compensator assembly with respect to the X-axis is determined by evaluating the relative amplitudes of the first and third signals, and the position of the compensator assembly with respect to the Y-axis is determined by evaluating the relative amplitudes of the second and fourth signals. The first optical element is preferably positioned along a plane substantially perpendicular to the first optical axis. The first light source may comprise a light emitting diode and a diffuser.

The laser transmitter may further include a leveling device coupled to the housing and receiving a signal from the quadrant photodetector representative of the position of the compensator assembly with respect to the X and Y axes, the leveling device adjusting a position of the housing based on the signal. The laser transmitter may include an indicator device receiving a signal from the quadrant photodetector representative of the position of the compensator assembly with respect to the X and Y-axes, a leveling device having a first rotatable screw and a second rotatable screw with respect to the X-axis and with respect to the Y-axis. The indicator device indicates a direction to rotate the first and second rotatable screws based on the signal.

According to another aspect of the present invention, a laser transmitting device comprises a housing, a laser light source coupled to the housing and generating laser light, a compensator assembly coupled to the housing and receiving and projecting the laser light along a first axis, a compensator assembly position detector detecting a position of the compensator assembly with respect to an X-axis and a Y-axis, and a leveling device coupled to the housing and receiving a signal from the compensator assembly position detector representative of the position of the compensator assembly with respect to the X and Y axes, the leveling device adjusting a position of the housing based on the signal.

Preferably, the compensator assembly position detector further comprises a first light source coupled to the housing and projecting a first light, a first optical element coupled to the compensator assembly, and a first photodetector coupled to the housing. The first photodetector receiving the first light passed through the first optical element. The first photodetector may comprise a first detecting area generating a first signal, a second detecting area generating a second signal, a third detecting area generating a third signal and a fourth detecting area generating a fourth signal. The first, second, third and fourth signals are representative of an amount of light projected onto respective detecting areas, such that the position of the compensator assembly with respect to the X-axis is determined by evaluating the relative amplitudes of the first and third signals, and the position of the compensator assembly with respect to the Y-axis is determined by evaluating the relative amplitudes of the second and fourth signals.

The compensator assembly position detector may further comprise a second light source coupled to the housing and projecting a second light, a second optical element coupled to the compensator assembly, and a second photodetector coupled to the housing. The second photodetector receives the second light passed through the second optical element. The first light source, the first optical element and the first photodetector may be positioned to determine the position of the compensator assembly with respect to the X-axis, and the second light source, the second optical element and the second photodetector may be positioned to determine the position of the compensator assembly with respect to the Y-axis. The first photodetector may comprise a first detecting area generating a first signal and a second detecting area generating a second signal, the second photodetector may comprise a third detecting area generating a third signal and a fourth detecting area generating a fourth signal. The first, second, third and fourth signals are representative of the amount of light projected onto respective detecting areas through respective first and second optical elements, such that the position of the compensator assembly with respect to the X-axis is determined by evaluating the relative amplitudes of the first and second signals, and the position of the compensator assembly with respect to the Y-axis is determined by evaluating the relative amplitudes of the third and fourth signals. Preferably, the first and second optical elements are selected from the group consisting of refractors, diffractors, lenses, irises, opaque shields, pinhole aperture plates, mirrors, prisms and fiber optic cables.

According to yet another aspect of the present invention, a laser transmitting device comprises a housing, a laser light source coupled to the housing and generating laser light, a compensator assembly coupled to the housing, a compensator assembly position detector, a leveling device having a first rotatable screw and a second rotatable screw for leveling the housing with respect to a X-axis and with respect to a Y-axis, and an indicator device. The compensator assembly receives and projects the laser light along a first axis. The compensator assembly position detector detects a position of the compensator assembly with respect to the X-axis and the Y-axis. The indicator device receives a signal from the compensator assembly position detector representative of the position of the compensator assembly with respect to the X and Y axes. The indicator device indicates a direction to rotate the first and second rotatable screws based on the signal. Preferably, the compensator assembly position detector further comprises a first light source coupled to the housing and projecting a first light, a first optical element coupled to the compensator assembly, and a first photodetector coupled to the housing and receiving the first light passed through the first optical element. The first photodetector may comprise a first detecting area generating a first signal, a second detecting area generating a second signal, a third detecting area generating a third signal and a fourth detecting area generating a fourth signal. The first, second, third and fourth signals being representative of an amount of light projected onto respective detecting areas, such that the position of the compensator assembly with respect to the X-axis is determined by evaluating the relative amplitudes of the first and third signals, and the position of the compensator assembly with respect to the Y-axis is determined by evaluating the relative amplitudes of the second and fourth signals.

The compensator assembly position detector may further comprise a second light source coupled to the housing and projecting a second light, a second optical element coupled to the compensator assembly, and a second photodetector coupled to the housing and receiving the second light passed through the second optical element. Preferably, the first light source, the first optical element and the first photodetector are positioned to determine the position of the compensator assembly with respect to the X-axis, and the second light source, the second optical element and the second photodetector are positioned to determine the position of the compensator assembly with respect to the Y-axis. The first photodetector may comprise a first detecting area generating a first signal and a second detecting area generating a second signal, the second photodetector may comprise a third detecting area generating a third signal and a fourth detecting area generating a fourth signal. The first, second, third and fourth signals are representative of the amount of light projected onto respective detecting areas through respective first and second optical elements, such that the position of the compensator assembly with respect to the X-axis is determined by evaluating the relative amplitudes of the first and second signals, and the position of the compensator assembly with respect to the Y-axis is determined by evaluating the relative amplitudes of the third and fourth signals. Preferably, the first and second optical elements are selected from the group consisting of refractors, diffractors, lenses, irises, opaque shields, pinhole aperture plates, mirrors, prisms and fiber optic cables.

According to yet another aspect of the present invention, an automated process for adjusting a position of a laser transmitter comprises the steps of generating laser light from a light source, directing the laser light along a first axis using a compensator assembly, determining a position of the compensator assembly with respect to an X-axis and a Y-axis, generating a signal representative of the position of the compensator assembly, and adjusting a position of the light source based on the signal.

According to yet another aspect of the present invention, a process for adjusting a position of a laser transmitter comprises generating laser light from a light source, directing the laser light along a first axis using a compensator assembly, determining a position of the compensator assembly with respect to an X-axis and a Y-axis, generating a signal representative of the position of the compensator assembly, and indicating a direction to move the light source in response to the signal.

Other objects and advantages of the invention will be apparent from the following description, the accompanying drawings and the appended claims.

DETAILED DESCRIPTION OF THE INVENTION

Figure 1:
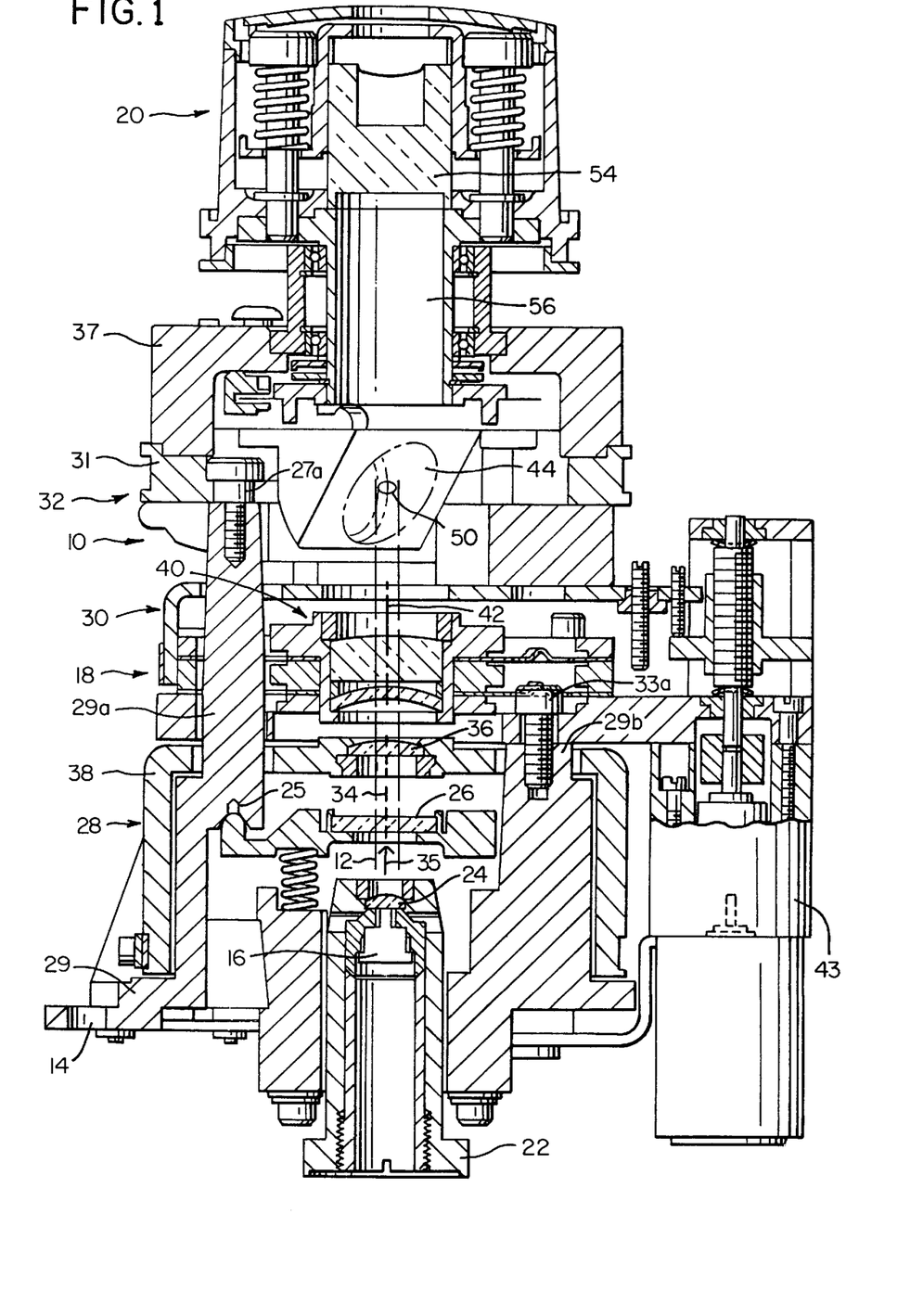
FIG. 1 is a cross-sectional view of a laser transmitter according to the present invention.

Referring now to FIG. 1, a laser transmitter 10 for transmitting a beam of laser light 12 is shown. The laser transmitter 10 includes a housing 14, a light source 16, an optical assembly 18 and an optical projecting device 20. The light source 16 is coupled to a assembly 22. According to the illustrated embodiment, the light source 16 is a laser diode which generates the beam of laser light 12. The assembly 22 includes a collection lens 24 that is positioned above the light source 16. The collection lens 24 serves to collect the laser beam 12 and project it in a first direction 35. Preferably, the collection lens 24 is a planar convex lens which collimates the laser beam 12.

The optical assembly 18 includes a flat window 26, a compensator assembly 28 and a focusing mechanism 30. The compensator assembly 28 includes an optics frame 29, a compensator cup 38 and a wire clamp ring 31. The optics frame 29 is coupled to and supported by the housing 14. The assembly 22 is coupled to the optics frame 29. The flat window 26 is positioned above the collection lens 24. The flat window 26 is pivotally coupled to the optics frame 29 through a spherical pivot 25. The flat window 26 tilts along an X-axis and a Y-axis using two calibration screws (not shown). The position of the flat window 26 is finely adjusted by the calibration screws so that the laser beam 12 is projected along substantially vertical axis or first axis 34. The laser beam 12 will therefore be plumb when the optics frame 29 is positioned along a plane which is substantially parallel with respect to the plane of the ground, i.e. substantially level. A plumb beam of light is light which is projected substantially vertical with respect to the ground. The laser beam 12 is projected along the first axis 34 by the light source 16 and the collection lens 120 and made plumb through the flat window 26. It should be apparent that the laser beam will be plumb as long as the optics frame 29 is substantially level with respect to the ground.

Figure 2:
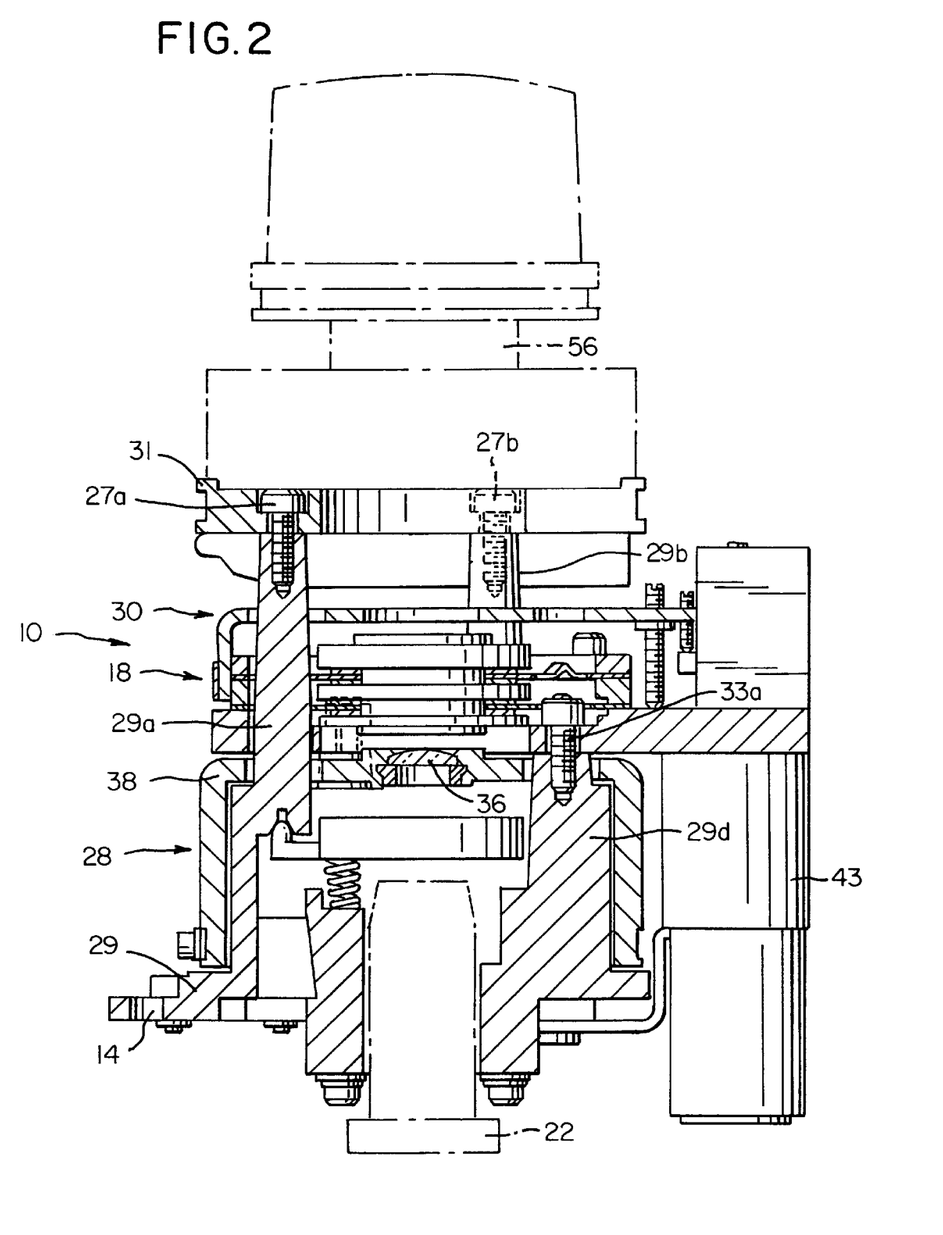
FIG. 2 is a schematic view of the laser transmitter of FIG. 1.
Figure 3:
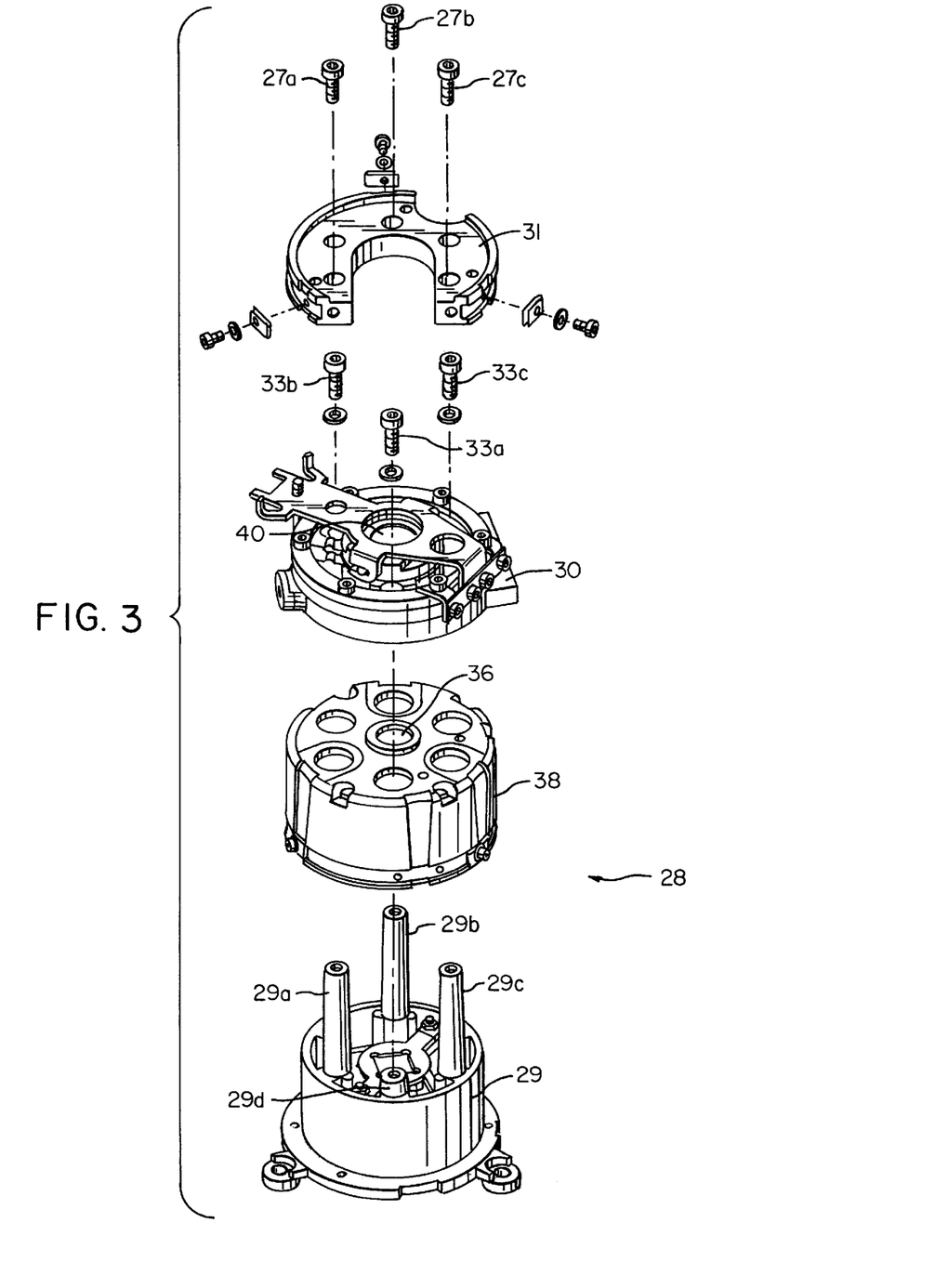
FIG. 3 is an exploded view of a compensator assembly as shown in FIG. 1.

The compensator assembly 28 optically adjusts the position of the laser beam 12 so that it is plumb even when the optics frame 29 is not substantially level. As shown in FIGS. 2 and 3, the compensator assembly 28 includes a compensating lens 36 mounted in the center of the compensator cup 38. The compensator cup 38 is positioned above the flat window 26 and swings freely on three wires (not shown) which are attached to the wire clamp ring 31. The wire clamp ring 31 is coupled to the optics frame 29 through three posts 29a, 29b, 29c by fasteners 27a, 27b, 27c. The compensator cup 38 is free to translate laterally when it is within a certain degree of level. In the illustrated embodiment, the compensator cup 38 is free to translate when it is within 12 minutes of level. As long as the compensator cup 38 is within 12 minutes of level, the compensating lens 36 may translate along the X and Y axes and optically adjust the position of the laser beam 12 so that it is plumb as it emerges from the compensator cup 38. The compensator cup 38 is suspended from the wire clamp ring 31 which is coupled to the optics frame 29 of the compensator assembly 28, so that once the compensator assembly 28 is within 12 minutes of level, the compensator cup 38 is also within 12 minutes of level. The compensator lens 36 may then optically adjust the position of the laser beam 12 so that it is plumb as it emerges from the compensator cup 38. The compensator assembly 28 therefore compensates optically for misalignments of the optics frame 29 which are within 12 minutes of level. It should be apparent that the flat window 26 and the compensator assembly 28 function to project the laser beam 12 along first axis 34, either singularly or in tandem.

The focusing mechanism 30 is positioned above the compensator cup 38 and coupled to the optics frame 29 through three small posts (only one post 29d shown) by three fasteners 33a, 33b, 33c. The three posts 29a, 29b, 29c of the optics frame 29 pass through the focusing mechanism 30 so that the focusing mechanism 30 does not contact the compensator cup 38. The focusing mechanism 30 includes a focusing lens 40 which is translated along the first axis 34 to adjust the focus of the laser beam 12. The focusing mechanism 30 is positioned so that the first axis 34 coincides with an optical axis 42 of the focusing lens 40. A plumb beam of laser light 12 is focused by the focusing mechanism 30 along the optical axis 42. The focusing mechanism 30 includes a focus motor 43 coupled to the focusing lens 40. The focus motor 43 is adapted to change the position of the focusing lens 40, thereby adjusting the focus of the laser beam 12. The focusing mechanism 30 is described in detail in copending application, U.S. Ser. No. 08/834,477 (Attorney Docket No. SPC 301 PA), now U.S. Pat. No. 5,805,362, FOCUSING MECHANISM USING A THIN DIAPHRAGM, filed Apr. 11, 1997, by Hayes, herein incorporated by reference. It will be appreciated by those skilled in the art that another focusing mechanism may be used without departing from the scope of the present invention. It will be further appreciated by those skilled in the art that the present invention may be practiced with or without the focusing mechanism 30.

The wire clamp ring 31 is positioned above the focusing mechanism 30. The wire clamp ring 31 is the upper most portion of the compensator assembly 28. The wire clamp ring 31 includes the three wires (not shown) for suspending the compensator cup 38. All of the optical components are coupled to either the optics frame 29 or the wire clamp ring 31. Consequently, the compensator assembly 28 is the main frame of reference for the laser transmitter 10.

Referring to FIGS. 1 and 2, the optical projecting device 20 is coupled to the wire clamp ring 31 through a mounting ring 37. The optical projecting device includes a motor (not shown) and a pentaprism 54 within a spindle 56. The optical projecting device 20 is positioned above the focusing mechanism 30 to deflect the laser beam 12 ninety degrees with respect to vertical. The pentaprism 54 is a structure which deflects incoming light at a ninety degree angle with respect to the direction of the incoming light, within limits, regardless of the precise orientation of the pentaprism 54. Consequently, the incoming light does not have to hit the pentaprism 54 at an exact location in order to be deflected ninety degrees. The pentaprism 54 is rotated within the spindle 56 by the motor at a speed of approximately 50 rpm to define a substantially horizontal plane of light. A speed of 50 rpm is well suited for visible perception of the laser light 12 by the user. However, as will be appreciated by those skilled in the art the pentaprism 54 may be rotated at any reasonable speed without departing from the scope of the present invention. While a pentaprism is used in the illustrated embodiment to deflect the incoming light, other light deflecting devices, such as a pentamirror, mirror, prism, reflector or refractor may also be used. While the laser transmitter 10 has been described with the laser light 12 being transmitted upwards, it will be appreciated by those skilled in the art that optical components may be shifted appropriately so that the laser light 12 is transmitted downwards, with the optical projecting device 20 being the lower most component and the light source 16 and assembly 22 being the upper most components.

Figure 4:
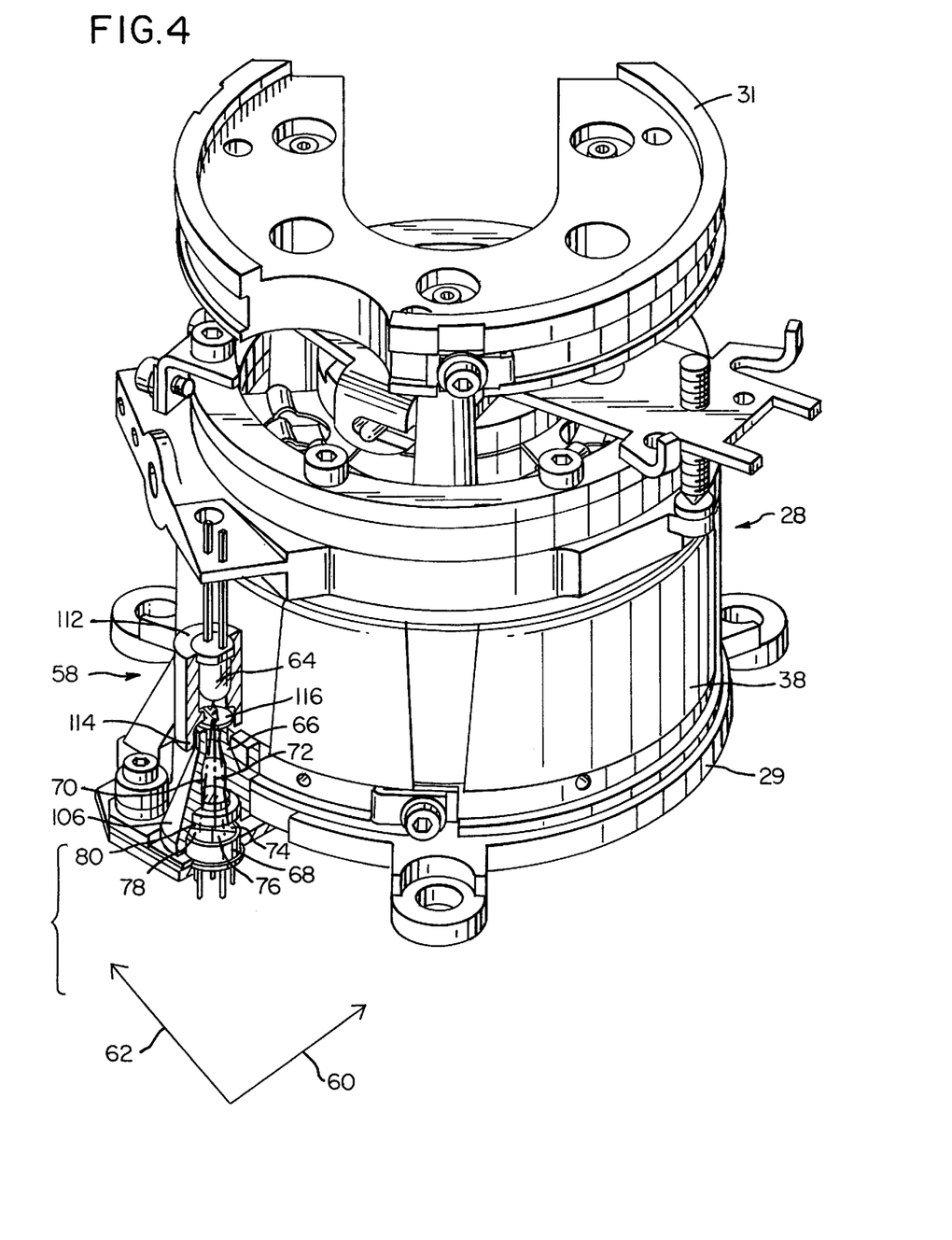
FIG. 4 is a perspective view of a compensator assembly position detector according to a first embodiment of the present invention.

The laser light 12 emerging from the pentaprism 54 will be substantially horizontal as long as the incident laser light 12 is plumb as stated above. The incident laser light 12 will be plumb as long as the compensator cup 38 is within 12 minutes of level. As shown in FIG. 4, a compensator assembly position detector 58 is used to detect the position of the compensator assembly 28 with respect to an X-axis 60 and a Y-axis 62. The compensator assembly position detector 58 includes a first light source 64, a first optical element 66 and a first photodetector 68. The first light source 64 and the first photodetector 68 are coupled to the optics frame 29 and remain fixed, while the first optical element 66 is coupled to the compensator cup 38 and moves with the same.

As shown in FIG. 4, the first light source 64 projects a first light 70 along a first optical axis 72. The first optical element 66 and the first photodetector 68 are positioned such that the first photodetector 68 receives the first light 70 which is passed through the first optical element 66. As shown in the illustrated embodiment, the first optical element 66 and the first photodetector 68 are aligned along the first optical axis 72. It will be appreciated by those skilled in the art that the first optical element 66 and the first photodetector 68 may be aligned along different axes without departing from the scope of the present invention. The exact alignment of the first light source 64, the first optical element 66 and the first photodetector 68 is dependent, in part, on the configuration of the first optical element 66 as described herein.

Figure 5:
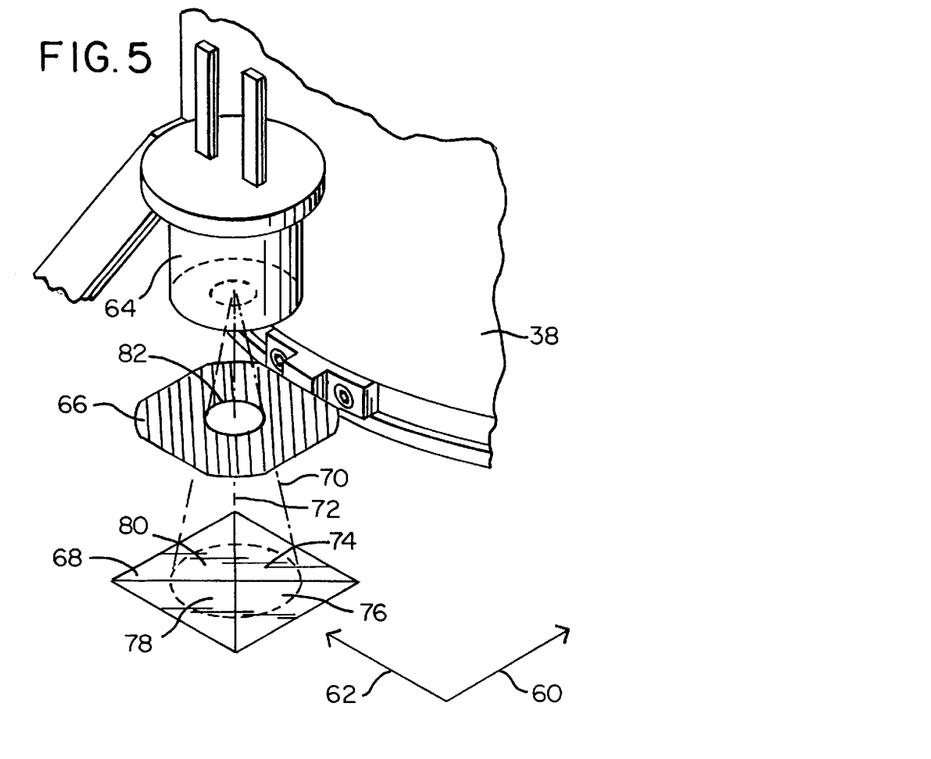
FIG. 5 is a schematic view of the compensator assembly position detector of FIG. 4.

According to a first embodiment of the present invention, the first photodetector 68 comprises a quadrant photodetector. As shown in FIG. 5, the quadrant photodetector has a first detecting area 74, a second detecting area 76, a third detecting area 78 and a fourth detecting area 80. Each detecting area is basically a distinct photodetector which generates a signal proportional to the amount of light projected onto the detecting area. Assuming that the first optical element 66 is an opaque plate having an aperture 82 (i.e. pinhole aperture plate) and that the first optical element 66 and the first photodetector 68 are aligned with the first optical axis 72, each detecting area 74, 76, 78, 80 will receive an equal amount of light. Since the first optical element 66 moves with respect to the first light source 64 and the first photodetector 68, the amount of first light 70 projected onto respective detecting areas 74, 76, 78, 80 is directly proportional to the position of the first optical element 66, and hence the compensator cup 38. The position of the compensator cup 38 with respect to the X-axis 60 may be determined by evaluating the relative amplitudes of the signals generated by the first detecting area 74 and the third detecting area 78. Similarly, the position of the compensator cup 38 with respect to the Y-axis 62 may be determined by evaluating the relative amplitudes of the signals generated by the second detecting area 76 and the fourth detecting area 80.

Figure 6:
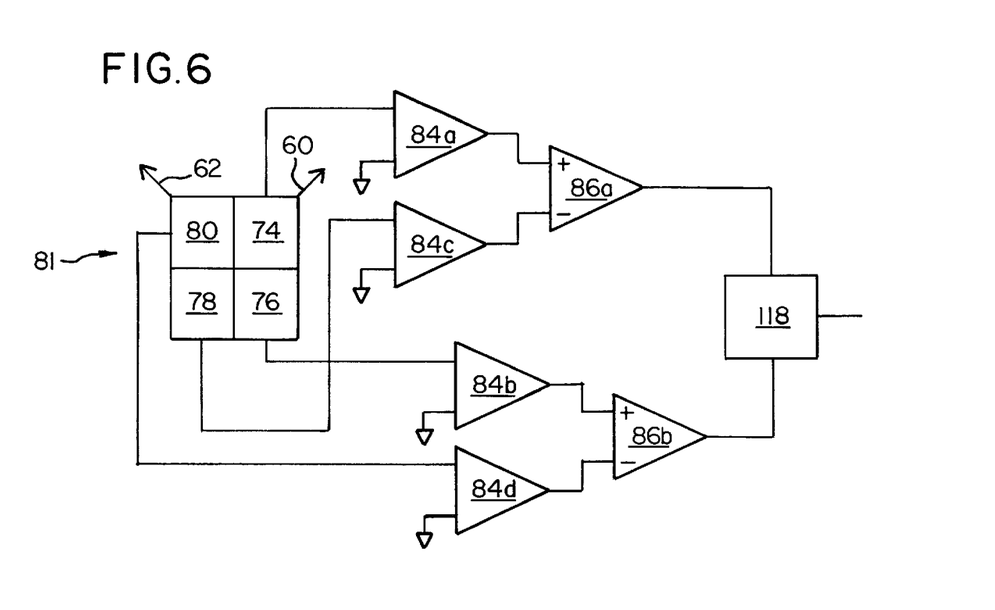
FIG. 6 is a schematic diagram of a detection circuit of the compensator assembly position detector of FIG. 4.

A detection circuit 81 for evaluating the relative amplitudes of the signals is shown in FIG. 6. Each detecting area 74, 76, 78, 80 generates a photocurrent proportional to the intensity of the light illuminating the area. The photocurrents are converted to voltages through transimpedance amplifiers 84*a*, 84*b*, 84*c*, 84*d*. The voltage output from each respective transimpedance amplifier 84*a*, 84*b*, 84*c*, 84*d* is directly proportional to the amount of light illuminating the respective detecting area. The voltages from the first transimpedance amplifier 84*a* and the third transimpedance amplifier 84*c* are input into a first differential amplifier 86*a* while the voltages from the second transimpedance amplifier 84*b* and the fourth transimpedance amplifier are input into a second transimpedance amplifier 86*b*. The differential amplifiers 86*a*, 86*b* output a voltage which is proportional to the difference of the input signals. The output voltage of the differential amplifier 86*a* indicates the relative position of the centroid of illumination along the X-axis 60, and hence, the relative position of the compensator cup 38 along the X-axis 60. Similarly, the output voltage of the differential amplifier 86*b* indicates the relative position of the centroid of illumination along the Y-axis 62, and hence, the relative position of the compensator cup 38 along the Y-axis 62. It will be appreciated by those skilled in the art that the relative position of the compensator 38 along the X and Y axes 60, 62 may be determined by taking a ratio of the above signals. It will be further appreciated by those skill in the art that a digital system may be used to evaluate the relative amplitudes of the above signals.

As is clearly illustrated in FIGS. 1, 4, and 5, the light source 16 illustrated in FIG. 1 comprises a primary light source operative to generate a primary beam of laser light and the first light source 64 illustrated in FIGS. 4 and 5 comprises a position detector light source that is operative to generate a secondary beam of light along a second axis offset from the first axis illustrated in FIG. 1. As is clearly illustrated in FIGS. 1 and 4, the position detector light source 64 is independent of the primary laser light source 16.

Figure 7:
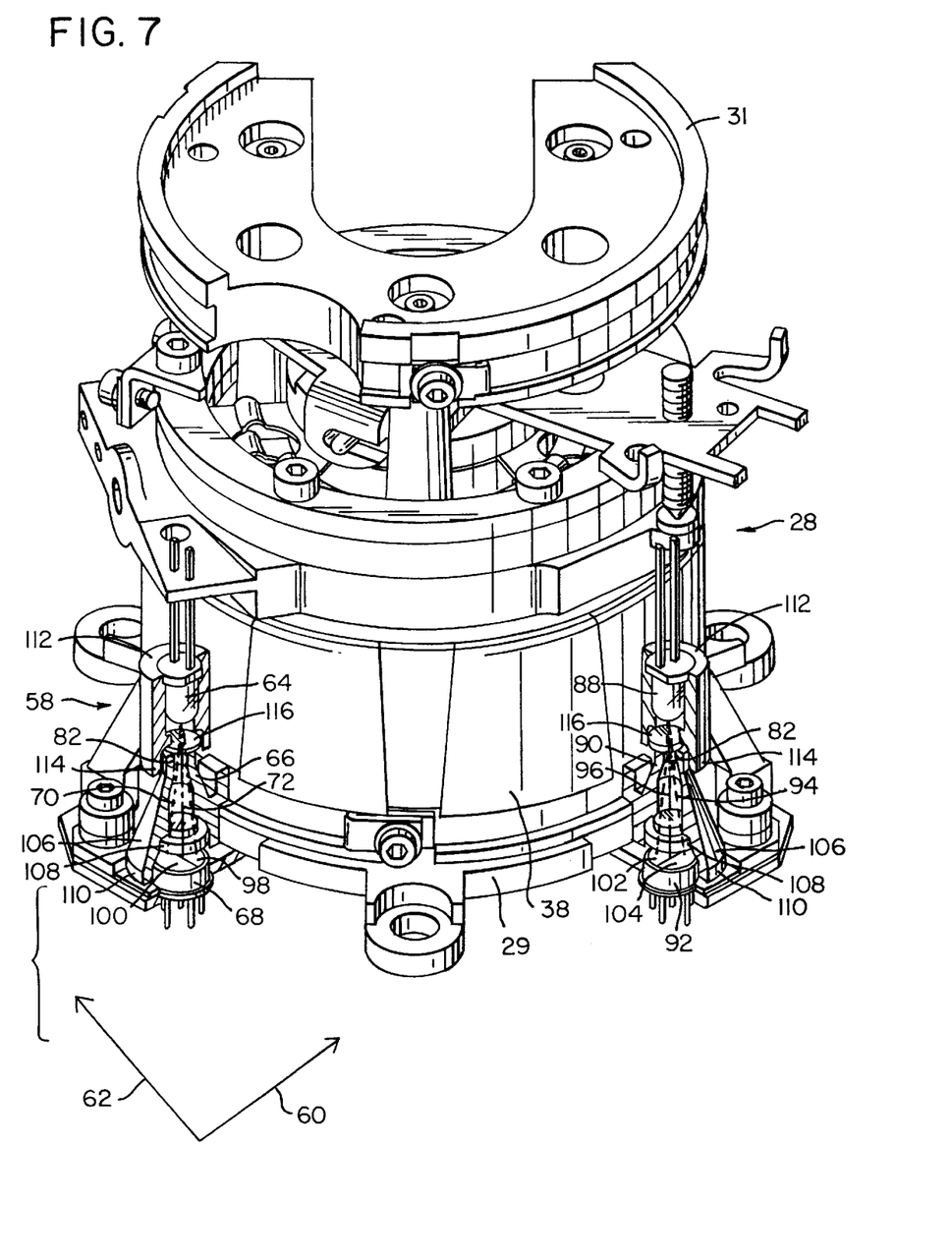
FIG. 7 is a perspective view of a compensator assembly position detector according to a second embodiment of the present invention.

According to a second embodiment of the present invention, the relative position of the compensator cup 38 with respect to the X and Y axes 60, 62 may be determined by using the first photodetector 68 to measure one of the axes and another photodetector to measure the other axis. As shown in FIG. 7, the compensator assembly position detector 58 may include a second light source 88, a second optical element 90 and a second photodetector 92. The second light source 88 projects a second light 94 along a second optical axis 96. The second optical element 90 may comprise an opaque plate having an aperture 82 as with the first optical element 66. Instead of a quadrant photodetector as in the first embodiment, the first and second photodetectors 68, 92 may include a dual cell photodetector. According to the illustrated embodiment, the first light source 64, the first optical element 66 and the first photodetector 68 are positioned to determine the position of the compensator cup 38 with respect to the X-axis 60 while the second light source 88, the second optical element 90 and the second photodetector 92 are positioned to determine the position of the compensator cup 38 with respect to the Y-axis 62. The first photodetector 68 is separated from the second photodetector 92 by approximately ninety degrees as measured from the center of the compensator cup 38. As with the first embodiment, the first photodetector 68 is positioned to receive the first light 70 passed through the first optical element 66. Similarly, the second photodetector 92 is positioned to receive the second light 94 passed through the second optical element 90.

Figure 8:
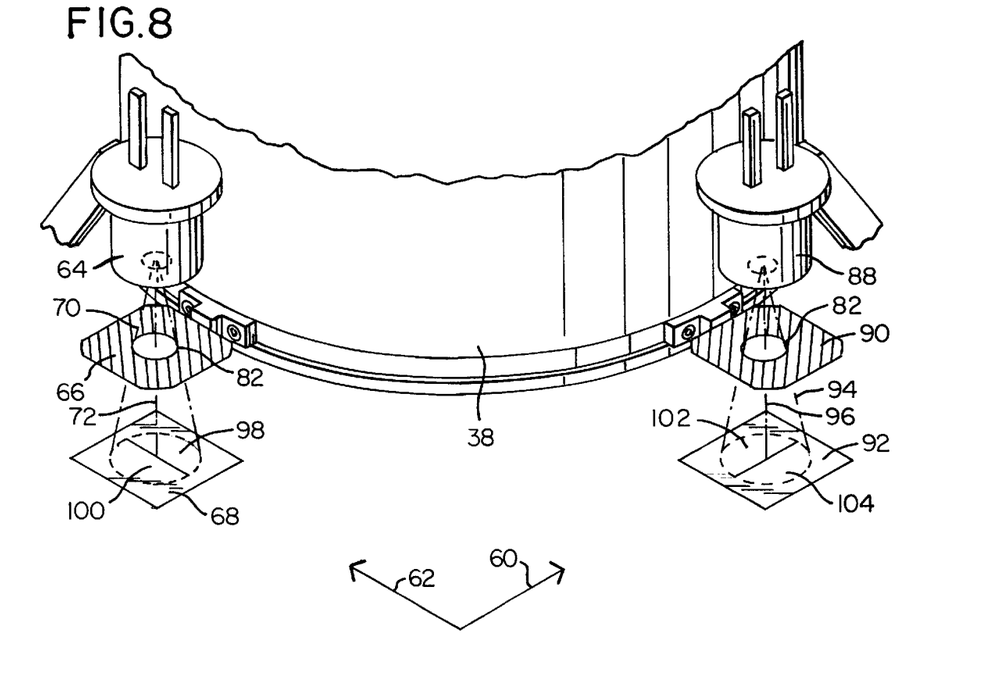
FIG. 8 is a schematic view of the compensator assembly position detector of FIG. 7.

The first and second photodetectors 68, 92 perform the same function as the quadrant photodetector of the first embodiment except each photodetector 68, 92 generates a signal with respect to a single axis only. As shown in FIG. 8, the first photodetector 68 includes a first detecting area 98 and a second detecting area 100. The second photodetector 92 includes a third detecting area 102 and a fourth detecting area 104. Each detecting area 98, 100, 102, 104 is basically a distinct photodetector which generates a signal proportional to the amount of light projected onto the detecting area. The first and second detecting areas 98, 100 are positioned along the X-axis 60, such that the intensity of the first light 70 projected onto each respective detecting area 98, 100 is directly proportional to the position of the compensator cup 38 along the X-axis 60. Similarly, the third and fourth detecting areas 102, 104 are positioned along the Y-axis 62, such that the intensity of the second light 94 projected onto each respective detecting area 102, 104 is directly proportional to the position of the compensator cup 38 along the Y-axis 62. The position of the compensator cup 38 with respect to the X-axis 60 may be determined by evaluating the relative amplitudes of the signals generated by the first detecting area 98 and the second detecting area 100. Similarly, the position of the compensator cup 38 with respect to the Y-axis 62 may be determined by evaluating the relative amplitudes of the signals generated by the third detecting area 102 and the fourth detecting area 104.

Figure 9:
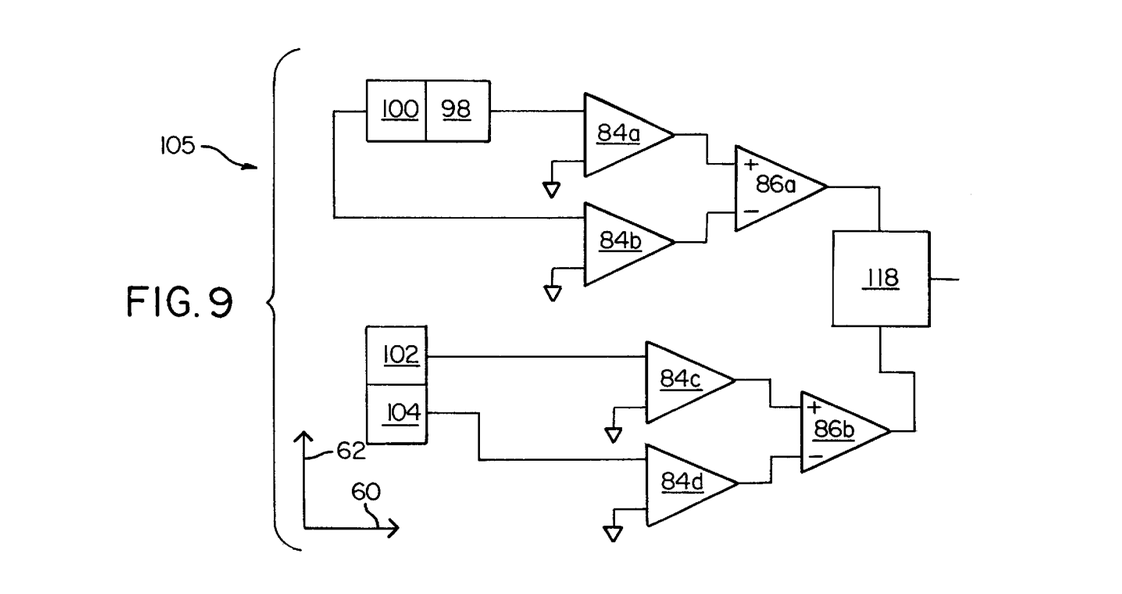
FIG. 9 is a schematic diagram of a detection circuit of the compensator assembly position detector of FIG. 7.

A detection circuit 105 similar to the detection circuit 81 of the first embodiment is shown in FIG. 9. The detection circuit 105 includes all of the same components as the detection circuit 81 such that all of the reference numbers are the same. The only difference between the two detection circuits 81, 105 is that the first differential amplifier 86a receives the voltage signals from the first and second transimpedance amplifiers 84a, 84b while the second differential amplifier 86b receives the voltage signals from the third and fourth transimpedance amplifiers 84c, 84d. The output voltage of the differential amplifier 86a indicates the relative position of the centroid of illumination along the X-axis 60, and hence, the relative position of the compensator cup 38 along the X-axis 60. Similarly, the output voltage of the differential amplifier 86b indicates the relative position of the centroid of illumination along the Y-axis 62, and hence, the relative position of the compensator cup 38 along the Y-axis 62. As with the first embodiment, other detection schemes may be used to evaluate the relative amplitudes of the above signals.

Figure 10A:
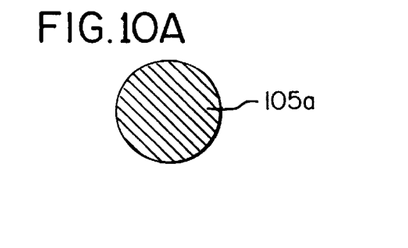
FIGS. 10a–10h are optical elements of the compensator assembly position detector of FIGS. 4 and 7.
Figure 10B:
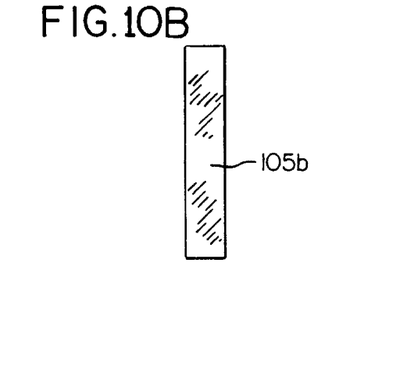
Figure 10C:
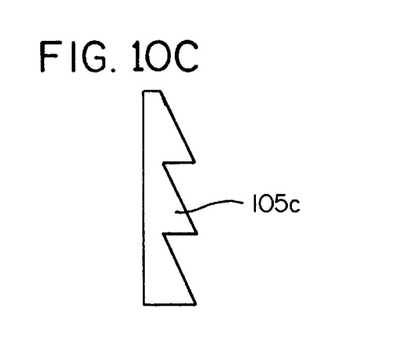
Figure 10D:
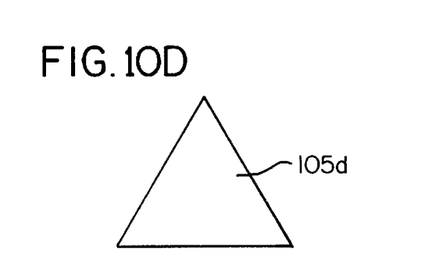
Figure 10E:
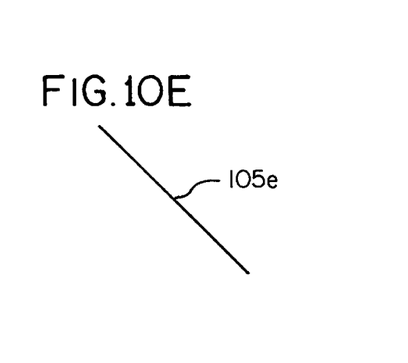
Figure 10F:
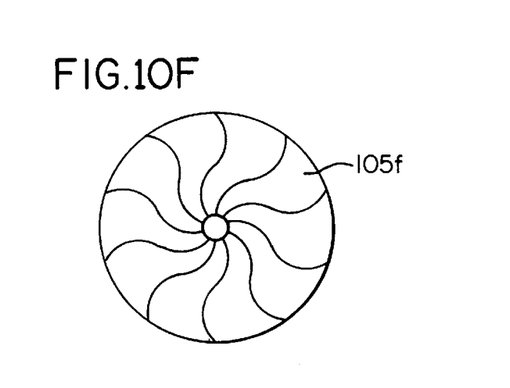
Figure 10G:
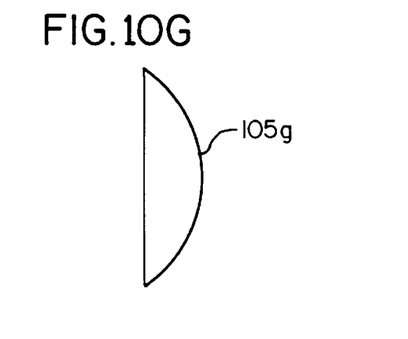
Figure 10H:
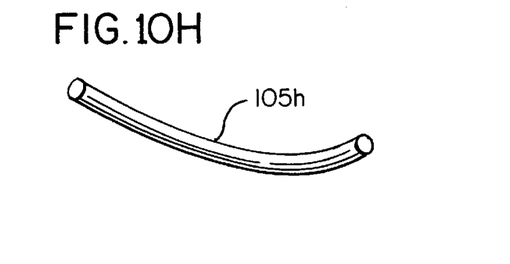

The first and second optical elements 66, 90 have been described as comprising opaque plates having the aperture 82. However, there are many different types of optical elements that may be used to accomplish the function of the opaque plates. As shown in FIG. 10a, the first and second optical elements 66, 90 may comprise an opaque shield 105a. The opaque shield 105a will cast a shadow on the detecting areas in direct proportion to the position of the opaque shield 105a such that the position of the compensator cup 38 is determined by evaluating the relative amplitude of light which is projected outside the shadow area. The opaque shield 105a functions the same way as the opaque plate with the aperture 82, just only in reverse. As shown in FIGS. 10b, 10c, 10d and 10e, the optical elements 66, 90 may comprise refractors 105b, diffractors 105c, prisms 105d or mirrors 105e. Depending on the configuration of the above elements, the amount of refraction, diffraction, dispersion or reflection will be directly proportional to the position of the optical element 66, 90 with respect to the respective light source 64, 88 and respective photodetector 68, 92. Finally, as shown in FIGS. 10f, 10g and 10h, the optical elements 66, 90 may comprise irises 105f, lenses 105g or fiber optic cables 105h. It should also be apparent that the optical elements 66, 90 may comprise any combination of the above elements. It will be appreciated by those skilled in the art that other similar optical elements may be used without departing from the scope of the present invention. Preferably, the first and second optical elements 66, 90 are positioned along planes which are substantially perpendicular to respective first and second optical axes 72, 96.

According to the illustrated embodiment in FIGS. 4 and 7, the first and second optical elements 66, 88 include a truncated cone portion 106 having the aperture 82 positioned substantially adjacent to the respective light sources 64, 88. The truncated cone portion 106 also includes a focusing lens 108 which is positioned substantially adjacent to respective photodetectors 68, 92. The focusing lens 108 focuses the light passed through the aperture 82 so that a more precise position measurement may be made. It should be apparent that the focusing lens 108 may be discarded if the detecting areas of the photodetectors are sufficiently large. The truncated cone portion 106 also includes a shoulder portion 110 which extends over the respective photodetector 68, 92. The shoulder portion 110 helps prevent extraneous light from reaching the respective photodetector 68, 92 which could cause inaccurate position measurements.

The first and second light sources 64, 88 are enclosed in a light source housing 112. The light source housing 112 includes a shoulder portion 114 which extends over the truncated cone portion 106. The shoulder portion 114 helps prevent extraneous light from entering the truncated cone portion 106 through the aperture 82. The light sources 64, 88 may comprise light emitting diodes for generating the first and second lights 68, 94. The light sources 64, 88 may also include diffusers 116. A substantially symmetric and uniform beam of light emerges from the diffuser 116 for more precise and accurate position measurements. It will be appreciated by those skilled in the art that other light sources may be used without departing from the scope of the present invention.

The position signals generated by the detection circuits 81, 105 may be used to level the compensator assembly 28 directly. The signals may also be used to level the housing 14 directly, thereby leveling the compensator assembly 28 indirectly. The voltage signals from the differential amplifiers 86a, 86b are inputted into a digital processor 118. The digital processor 118 is coupled to a printed circuit board (not shown) which is coupled to the focusing mechanism 30. It will be appreciated by those skilled in the art that the digital processor 118 may be coupled to the laser transmitter 10 in any reasonable manner and location.

Figure 11:
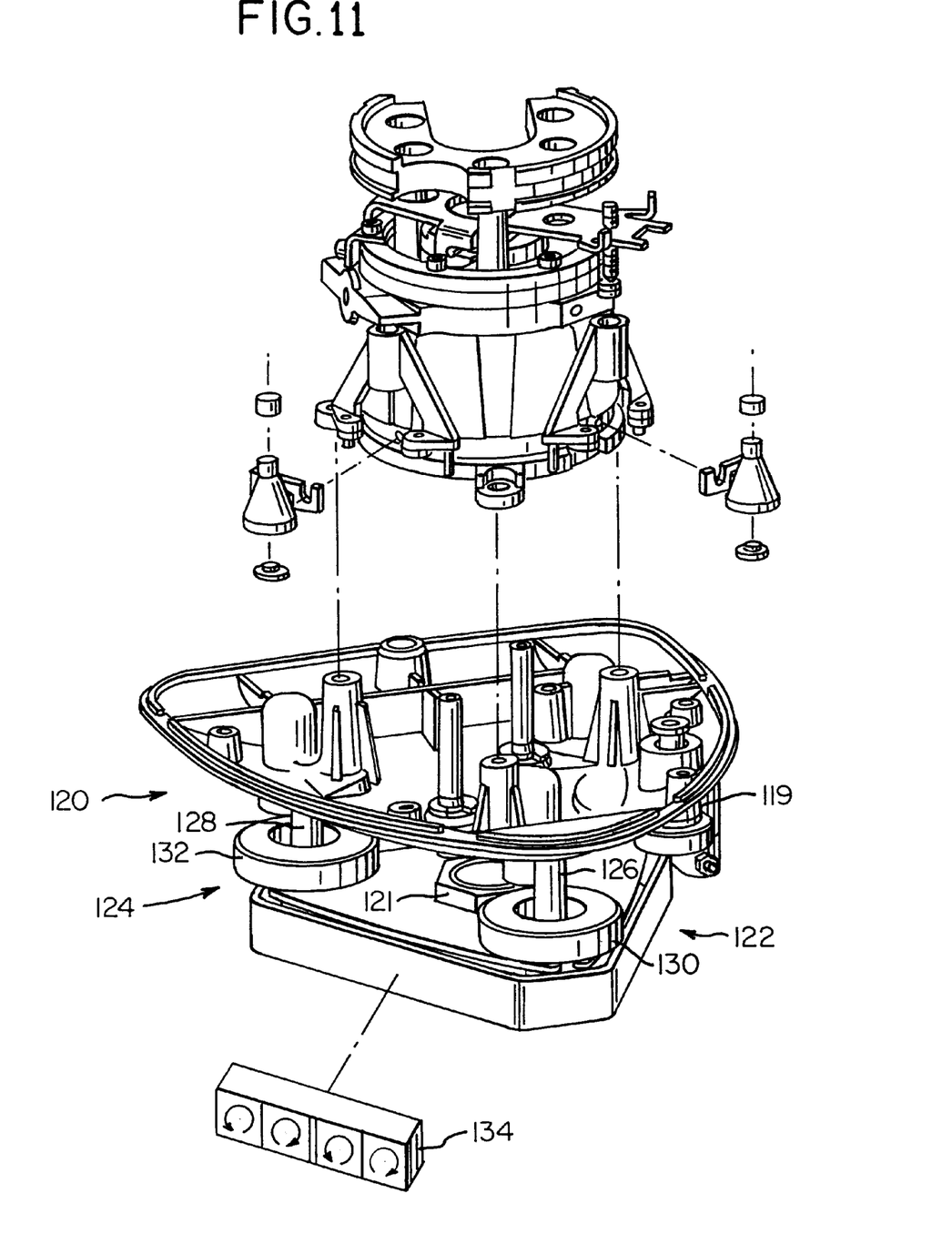
FIG. 11 is a perspective view of a leveling device according to a third embodiment of the present invention.

According to a third embodiment of the present invention, the digital processor 118 is adapted to receive the above voltage signals and is programmed to control a leveling device 120 which is coupled to the housing 14 through a pivot joint 119; see FIG. 11. The leveling device 120 is coupled to a tripod (not shown) through a mounting device 121. The leveling device 120 comprises a first leveling member 122 and a second leveling member 124. The first and second leveling members 122, 124 adjust the position of the housing 14, and hence the compensator assembly 28, with respect to the X and Y axes 60, 62. The position of the housing 14 changes with respect to the leveling device 120, and hence, with respect to the X and Y axes 60, 62. The first leveling member 122 includes a first rotatable or adjustable screw 126 while the second leveling member 124 includes a second rotatable or adjustable screw 128. Rotation of the adjustable screws 126, 128 causes the housing 14 to pivot about pivot joint 119, thereby adjusting the position of the housing 14 with respect to the X and Y axes 60, 62. The adjustable screws 126, 128 may be rotated manually via a first knob 130 and a second knob 132. The digital processor 118 controls an indicator device 134 which instructs the operator which knob 130, 132 to turn and in which direction. The indicator device 134 may comprise a set of light emitting diodes or a display device which indicates how to bring the compensator assembly 28 into level. The digital processor 118 controls the indicator device 134 until the compensator assembly 28 is level within 12 minutes. Once the compensator assembly 28 is within 12 minutes of level, the laser beam 12 will be plumb as the compensator assembly 28 automatically aligns the laser beam 12 optically as described above.

Figure 12:
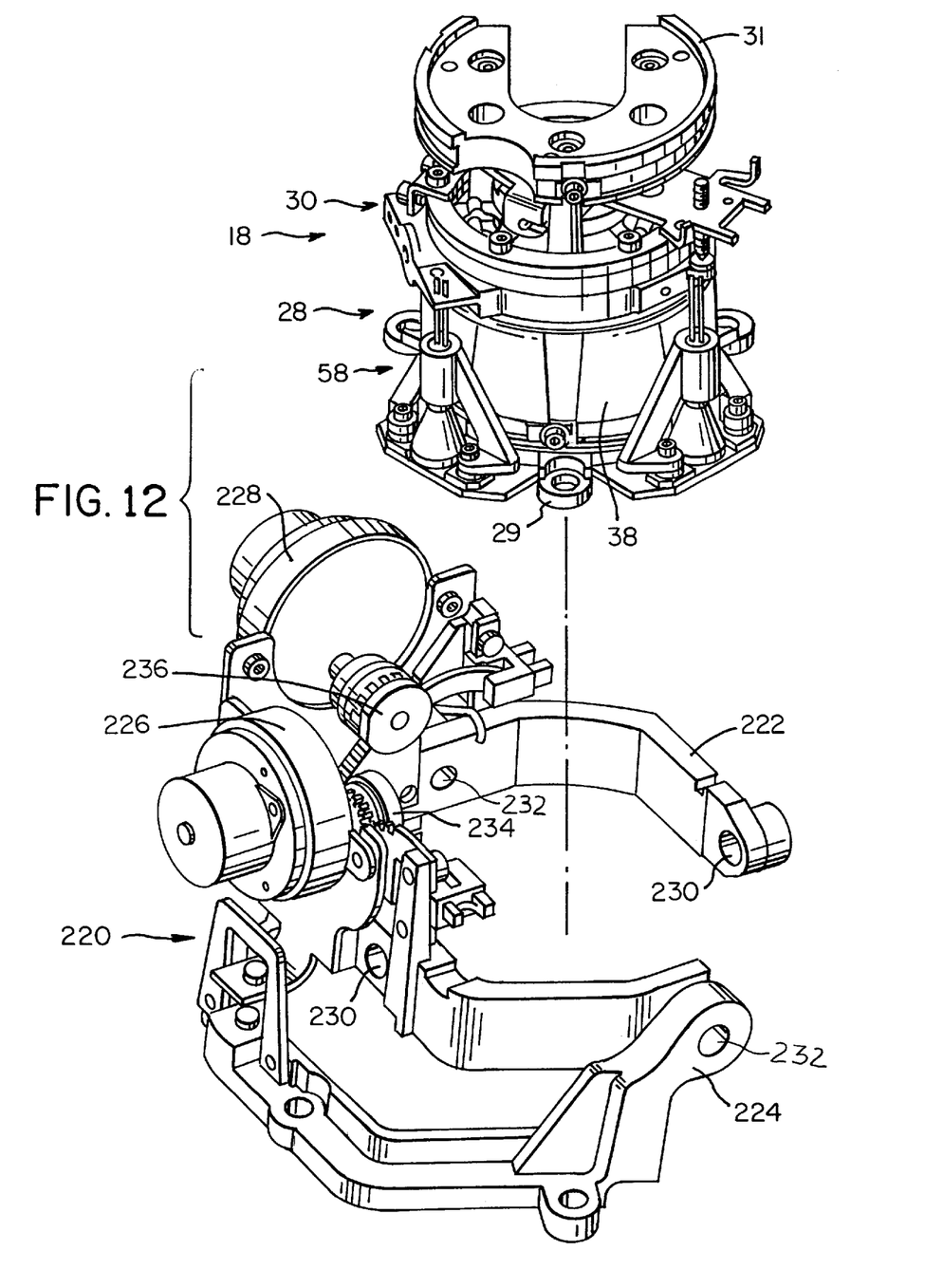
FIG. 12 is a perspective view of a leveling device according to a fourth embodiment of the present invention.

The compensator assembly 28 may be leveled directly and automatically according to a fourth embodiment of the present invention. A leveling device 220 is shown in FIG. 12. The leveling device 220 includes an inner gimbal mechanism 222, an outer gimbal mechanism 224, an X-axis motor 226 and a Y-axis motor 228. The compensator assembly 28 is rotatably coupled to the inner gimbal mechanism 226 through mutually opposing pivot joints 230. The outer gimbal mechanism 228 is rotatably coupled to the inner gimbal mechanism 226 through mutually opposing pivot joints 232. The outer gimbal mechanism 228 is mounted to mounting device (not shown) through mounting posts (not shown). The outer gimbal mechanism 228 is fixed while the compensator assembly 28 is suspended from the inner gimbal mechanism 226.

The X-axis motor 226 is coupled to the inner gimbal mechanism 226 and to the compensator assembly 28 through an X-axis gearing mechanism 234. The X-axis motor 226 effectuates rotation of the X-axis gearing mechanism 234 which causes rotation of the compensator assembly 28 within the inner gimbal mechanism 226 and about the X-axis 60. The Y-axis motor 228 is coupled to the outer gimbal mechanism 228 and to the inner gimbal mechanism 226 through a Y-axis gearing mechanism 236. The Y-axis motor 228 effectuates rotation of the Y-axis gearing mechanism 236 which causes rotation of the inner gimbal mechanism 226 about the Y-axis 62. The compensator assembly 28 rotates about the Y-axis 62 with the inner gimbal mechanism 226. The X-axis motor 226 rotates with the inner gimbal mechanism 226 while the Y-axis motor 228 remains fixed to the outer gimbal mechanism 228. The digital processor 118 is adapted to receive the position signal from the compensator assembly position detector 58 and is programmed to control the X and Y axis motors 226, 228 until the compensator assembly 28 is level within 12 minutes. The leveling device 220 performs rough leveling while the compensator assembly 28 performs fine leveling. The laser transmitter 10 is automatically leveled through the rough mechanical leveling of the compensator assembly 28 by the leveling device 220 and the fine optical leveling by the compensator assembly 28. Since the leveling operation is completed with respect to the compensator assembly 28, once the compensator assembly 28 is level within 12 minutes, the laser beam 12 will be substantially plumb as it emerges from the compensator assembly 28.

It will be appreciated by those skilled in the art that the manual and automatic leveling operations are not restricted to the disclosed leveling devices 120, 220. The laser transmitter 10 may be automatically leveled with respect to the housing 14 and manually leveled with respect to the compensator assembly 28. The laser transmitter 10 may be automatically leveled with respect to the housing 14 by replacing the first and second knobs 130, 132 with leveling motors controlled by the digital processor 118. Similarly, the laser transmitter 10 may be manually leveled with respect to the compensator assembly 28 by replacing the X and Y axis motors with rotatable knobs and an indicator device 134 as disclosed above. It will be further appreciated that other leveling devices controlled by the digital processor 118 may be used to level the housing 14 or the compensator assembly 28 without departing from the scope of the present invention. It will be appreciated by those skilled in the art that the inner and outer gimbal mechanisms 226, 228 may be aligned in such a manner so that the position of the laser transmitter 10 is adjusted without the axis of rotation for the inner and outer gimbal mechanisms 226, 228 being directly aligned with the X and Y axes 60, 62.

Having described the invention in detail and by reference to preferred embodiments thereof, it will be apparent that modifications and variations are possible without departing from the scope of the invention which is defined in the appended claims.

What is claimed is:

1. A laser transmitting device comprising:

a housing;

a primary laser light source coupled to said housing and operative to generate a primary beam of laser light;

a compensator assembly coupled to said housing, said compensator assembly receiving and projecting said primary beam of laser light along a first axis;

an optical projecting device positioned to deflect said primary beam of laser light to define a reference beam of light projected out of said housing; and a compensator assembly position detector comprising a photodetector and a position detector light source operative to generate a secondary beam of light along a second axis offset from said first axis, wherein said position detector light source is independent of said primary laser light source, and wherein said compensator assembly position detector is arranged to detect a position of said compensator assembly with respect to an X-axis and a Y-axis as a function of a position of said secondary beam of light on said photodetector.

2. The laser transmitting device of claim 1, wherein said compensator assembly comprises an optics frame coupled to said housing and a compensator cup suspended from said optics frame.

3. The laser transmitting device of claim 2, wherein:

said position detector light source is coupled to said optics frame;

a first optical element is coupled to said compensator assembly;

said photodetector is coupled to said optics frame; and said position detector light source, said first optical element, and said photodetector are arranged such that said secondary beam of light passes through said first optical element and is received by said photodetector.

4. The laser transmitting device of claim 3, wherein said first optical element is selected from the group consisting of refractors, diffractors, lenses, irises, opaque shields, pinhole aperture plates, mirrors, prisms and fiber optic cables.

5. The laser transmitting device of claim 1, wherein said photodetector comprises a first detecting area operative to generate a first signal, a second detecting area operative to generate a second signal, a third detecting area operative to generate a third signal, and a fourth detecting area operative to generate a fourth signal, said first, second, third and fourth signals being representative of an amount of light projected onto respective detecting areas, such that said position of said compensator assembly with respect to said X-axis is determined by evaluating the relative amplitudes of said first and third signals, and said position of said compensator assembly with respect to said Y-axis is determined by evaluating the relative amplitudes of said second and fourth signals.

6. The laser transmitting device of claim 3, wherein said first optical element is positioned along a plane substantially perpendicular to said second axis.

7. The laser transmitting device of claim 3, wherein said position detector light source comprises a light emitting diode.

8. The laser transmitting device of claim 7, wherein said position detector light source further comprises a diffuser.

9. The laser transmitting device of claim 1, wherein said housing further comprises a leveling device, said leveling device receiving a signal from said photodetector representative of said position of said compensator assembly with respect to said X and Y axes, said leveling device adjusting a position of said housing based on said signal.

10. The laser transmitting device of claim 1, further comprising:

an indicator device receiving a signal from said photodetector representative of said position of said compensator assembly with respect to said X and Y-axes; and a leveling device having a first rotatable screw and a second rotatable screw for leveling said housing with respect to said X-axis and with respect to said Y-axis, said indicator device indicating a direction to rotate said first and second rotatable screws based on said signal.

11. A laser transmitting device comprising:

a housing;

a laser light source coupled to said housing and operative to generate a beam of laser light;

a compensator assembly coupled to said housing, said compensator assembly receiving and projecting said beam of laser light along a first axis;

an optical projecting device positioned to deflect said beam of laser light to define a reference beam of light projected out of said housing;

a compensator assembly position detector comprising a photodetector wherein said compensator assembly position detector is arranged to detect a position of said compensator assembly with respect to an X-axis and a Y-axis as a function of a signal produced by said photodetector; and a leveling device coupled to said compensator assembly, said leveling device including at least one motor responsive to a signal from said compensator assembly position detector, said motor being operative to alter said position of said compensator assembly with respect to said X and Y axes independent of a position of said housing with respect to said X and Y axes.

12. A laser transmitting device as claimed in claim 11, wherein:

said leveling device comprises an inner gimbal mechanism, an outer gimbal mechanism, an X-axis motor, and a Y-axis motor;

said compensator assembly is coupled to said inner gimbal mechanism;

said outer gimbal mechanism is coupled to said inner gimbal mechanism;

said X-axis motor is coupled to said inner gimbal mechanism; and said Y-axis motor is coupled to said outer gimbal mechanism.

13. A laser transmitting device as claimed in claim 11 further comprising an optics frame secured to said housing and a digital processor, wherein:

said compensator assembly is arranged to move within said optics frame to compensate optically for out-of-plumb misalignments of said optics frame;

said optical compensation of said compensator assembly is effective within a predetermined optics frame misalignment range; and said digital processor is programmed to control a position of said compensator assembly via said leveling device such that said compensator assembly is maintained within said predetermined optics frame misalignment range;

control said position of said compensator assembly in response to said signal from said compensator assembly position detector; and control said position of said compensator assembly independent of a position of said housing with respect to said X and Y axes.

14. A laser transmitting device as claimed in claim 11 wherein:

said laser light source comprises a primary laser light source operative to generate a primary beam of laser light along said first axis;

said compensator assembly position detector further comprises a position detector light source operative to generate a secondary beam of light along a second axis offset from said first axis, wherein said position detector light source is independent of said primary laser light source; and said compensator assembly position detector is arranged to detect said position of said compensator assembly as a function of a position of said secondary beam of light on said photodetector.

15. An automated process for adjusting a position of a laser transmitter, said process comprising the steps of:

generating a beam of laser light from a light source coupled to a housing;

directing said beam of laser light along a first axis using a compensator assembly;

deflecting said beam of laser light to define a reference beam of laser light projected out of said laser transmitter;

determining a position of said compensator assembly with respect to an X-axis and a Y-axis as a function of a signal produced by a photodetector;

generating a signal representative of said position of said compensator assembly;

providing a motor responsive to said signal representative of said position of said compensator assembly;

controlling said motor so as to alter said position of said compensator assembly with respect to said X and Y axes independent of a position of said housing with respect to said X and Y axes.

16. The laser transmitting device of claim 1, wherein said housing further comprises a leveling device coupled to said compensator assembly, said leveling device including at least one motor responsive to a signal from said compensator assembly position detector, said motor being operative to alter said position of said compensator assembly with respect to said X and Y axes independent of a position of said housing with respect to said X and Y axes.

17. An automated process for adjusting a position of a laser transmitter, said process comprising the steps of:

generating a primary beam of laser light from a primary light source;

directing said primary beam of laser light along a first axis using a compensator assembly;

deflecting said primary beam of laser light to define a reference beam of laser light projected out of said laser transmitter;

generating a secondary beam of light from a position detector light source independent of said primary light source along a second axis offset from said first axis;

determining a position of said compensator assembly with respect to an X-axis and a Y-axis as a function of a position of said secondary beam of light on a photodetector;

generating a signal representative of said position of said compensator assembly; and adjusting a position of said primary light source based on said signal.

* * * * *